(12) United States Patent
Leskela et al.

(10) Patent No.: US 8,754,961 B2
(45) Date of Patent: Jun. 17, 2014

(54) APPARATUS AND METHOD FOR GENERATING IMAGE DATA FROM OVERLAPPING REGIONS OF IMAGES

(75) Inventors: Jyrki Veikko Leskela, Haukipudas (FI); Jarmo Antero Nikula, Jaali (FI); Mika Allan Salmela, Oulu (FI); Aki Happonen, Kliminki (FI); Teemu Ahmaniemi, Helsinki (FI); Teppo Tapani Jokinen, Espoo (FI); Vuokko Lantz, Vantaa (FI); Daoxiang Zhang, Helsinki (FI); Santeri Vanhakartano, Helsinki (FI); Jorge Paquentin, Coyoacan (MX)

(73) Assignee: Nokia Corporation, Espoo (FI)

( * ) Notice: Subject to any disclaimer, the term of this patent is extended or adjusted under 35 U.S.C. 154(b) by 69 days.

(21) Appl. No.: 13/211,975

(22) Filed: Aug. 17, 2011

(65) Prior Publication Data
US 2013/0044240 A1 Feb. 21, 2013

(51) Int. Cl.
*H04N 5/262* (2006.01)

(52) U.S. Cl.
USPC .......................................................... 348/239

(58) Field of Classification Search
USPC ............................................ 348/36–39, 239
See application file for complete search history.

(56) References Cited

U.S. PATENT DOCUMENTS 5,646,679 A * 7/1997 Yano et al. ....................... 348/47

(Continued)

FOREIGN PATENT DOCUMENTS

| EP | 1 447 995 A2 | 8/2004 |
| EP | 1 566 974 A1 | 8/2005 |
| JP | 2003051872 A | * 2/2003 |
| JP | 2004235926 A | * 8/2004 |

OTHER PUBLICATIONS

Nokia patents innovative new flexible display technology—Cell Phones & Mobile Device . . . [online] [retrieved Aug. 26, 2011]. Retrieved from the Internet: <URL: http//www.geek.com/articles/mobile/nokia-patents-innovative-new-flexible-display-techn . . . >>. 9 pages.
AT&T's LG Thrill 4G hand-on (video)—Engadget [online] [retrieved Aug. 26, 2011]. Retrieved from the Internet: <URL: http://www.engadget.com/2011/03/22/atandts-lg-thrill-4g-hands-on-video/4>. 9 pages.

(Continued)

*Primary Examiner* — Gary C Vieaux
(74) *Attorney, Agent, or Firm* — Alston & Bird LLP

(57) ABSTRACT

Apparatus comprises at least one processor; at least one memory having computer-readable code stored thereon; a first camera module configured to provide first image data representative of a first image; and a second camera module configured to provide second image data representative of a second image. The first and second camera modules are arranged either side of an axis about which the first camera module is rotatable relative to the second camera module, and are arranged such that, when the first camera module is rotated relative to the second camera module by less than a threshold angle, a region of the first image overlaps a region of the second image. The computer-readable code, when executed by the at least one processor, causes the at least one processor to process the first image data and the second image data; and to generate third image data representative of a third image, the third image representing at least corresponding portions of the overlapping regions of the first and second images.

21 Claims, 13 Drawing Sheets

(56) References Cited

U.S. PATENT DOCUMENTS

| | | | |
|---|---|---|---|
| 5,657,073 | A | 8/1997 | Henley |
| 6,304,284 | B1 * | 10/2001 | Dunton et al. ............... 348/36 |
| 7,190,389 | B1 * | 3/2007 | Abe et al. .................... 348/42 |
| 2002/0041717 | A1 * | 4/2002 | Murata et al. ............... 382/275 |
| 2004/0141064 | A1 * | 7/2004 | Ezawa .................. 348/207.99 |
| 2006/0238494 | A1 | 10/2006 | Narayanaswami et al. |
| 2008/0225129 | A1 * | 9/2008 | Viinikanoja et al. ....... 348/218.1 |
| 2010/0011291 | A1 | 1/2010 | Nurmi |
| 2010/0056223 | A1 | 3/2010 | Choi et al. |
| 2010/0141605 | A1 | 6/2010 | Kang et al. |
| 2010/0289881 | A1 * | 11/2010 | Xu .............................. 348/47 |

OTHER PUBLICATIONS

Toshiba flexes its paper-thin LCD muscle—YouTube [online] [retrieved Aug. 26, 2011]. Retrieved from the Internet: <URL: http://www.youtube.com/watch?v=vngSpW6fmeo>. 2 pages.

Nomura et. al., "Scene Collages and Flexible Camera Arrays." Eurographics Symposium on Rendering, dated 2007

International Search Report for Application No. PCT/IB2012/054159, dated Apr. 8, 2013.

* cited by examiner

APPARATUS AND METHOD FOR GENERATING IMAGE DATA FROM OVERLAPPING REGIONS OF IMAGES

FIELD

The invention relates to an apparatus and a method for generating image data.

BACKGROUND

Mobile phone cameras typically have a fixed focal length so as to ensure that both the size and the cost of the camera module remain relatively low.

So-called "panoramic imaging" allows expansion of the viewing angle. However, the user must pan across a scene by gradually rotating the mobile phone. Software then constructs a complete panoramic image. This method is not particularly intuitive and also requires the user to keep the mobile phone very steady as they are panning across the scene. The quality of the resulting panoramic image generally can be improved by using a support which has a rotating head to which the mobile phone can be secured. However, this requires the user to carry with them the support in addition to their mobile phone.

SUMMARY

In a first aspect, this specification describes apparatus comprising at least one processor, at least one memory having computer-readable code stored thereon, a first camera module configured to provide first image data representative of a first image, a second camera module configured to provide second image data representative of a second image, wherein the first and second camera modules are arranged either side of an axis about which the first camera module is rotatable relative to the second camera module, and are arranged such that, when the first camera module is rotated relative to the second camera module by less than a threshold angle, a region of the first image overlaps a region of the second image, wherein the computer-readable code, when executed by the at least one processor, causes the at least one processor to process the first image data and the second image data, and to generate third image data representative of a third image, the third image representing at least corresponding portions of the overlapping regions of the first and second images.

In a second aspect, this specification describes a method comprising providing apparatus comprising a first camera module configured to provide first image data representative of a first image and a second camera module configured to provide second image data representative of a second image, wherein the first and second camera modules are arranged either side of an axis about which the first camera module is rotatable relative to the second camera module, and are arranged such that, when the first camera module is rotated relative to the second camera module by less than a threshold angle, a region of the first image overlaps a region of the second image, processing the first image data and the second image data, and generating third image data representative of a third image, the third image representing at least corresponding portions of the overlapping regions of the first and second images.

In third aspect, this specification describes apparatus comprising a first camera module configured to provide first image data representative of a first image, a second camera module configured to provide second image data representative of a second image, wherein the first and second camera modules are arranged either side of an axis about which the first camera module is rotatable relative to the second camera module, and are arranged such that, when the first camera module is rotated relative to the second camera module by less than a threshold angle, a region of the first image overlaps a region of the second image, means for processing the first image data and the second image data, and means for generating third image data representative of a third image, the third image representing at least corresponding portions of the overlapping regions of the first and second images.

BRIEF DESCRIPTION OF THE FIGURES

For a more complete understanding of example embodiments of the present invention, reference is now made to the following description taken in connection with the accompanying drawings in which.

DETAILED DESCRIPTION OF EXAMPLE EMBODIMENTS

Figure 1:
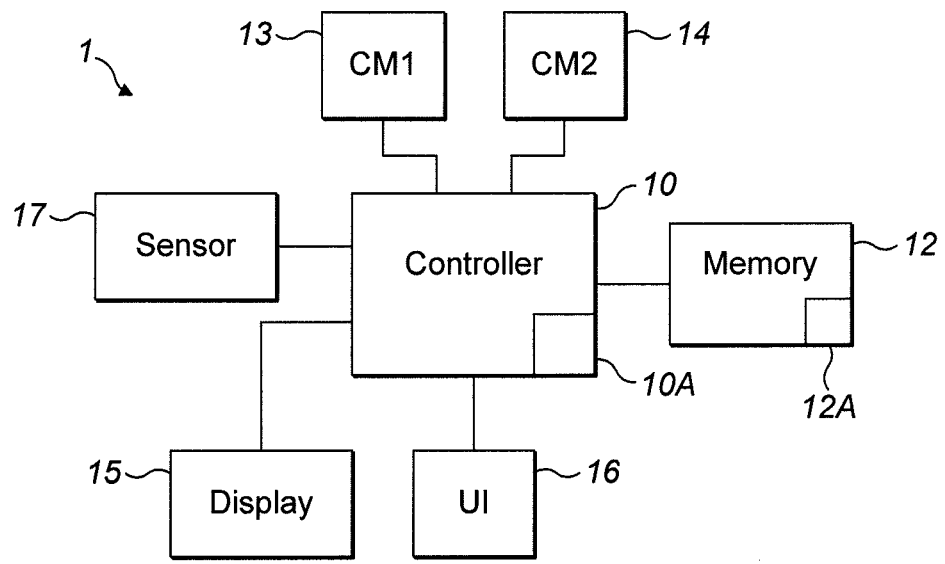
FIG. 1 is a schematic illustration of apparatus according to example embodiments of the invention.

In the description and drawings, like reference numerals refer to like elements throughout.

FIG. 1 is a schematic illustration of apparatus 1 according to example embodiments of the invention.

The apparatus 1 comprises a controller 10, at least one memory 12, a first camera module 13 and a second camera module 14. The first camera module 13 is configured to provide first image data to the controller 10. The first image data is representative of a first image that is within the field of view of the first camera module 13. The second camera module 14 is configured to provide to the controller 10 second image data. The second image data is representative of a second image that is within the field of view of the second camera module 14.

The controller 10 comprises at least one processor 10A, which may be of any suitable type, such as but not limited to processors and microprocessors. The controller 10 may additionally comprise one or more application specific integrated circuits (not shown). The at least one processor 10A is operable to execute computer readable code 12A stored in the at least one memory 12 and to perform operations under the control of the computer readable code 12A. The controller 10 is operable to receive the first image data from the first camera module 13 and the second image data from the second module and to process these in accordance with instructions conveyed by the computer readable code 12A.

In the example of FIG. 1, the apparatus 1 also comprises a display 15. The display 15 is operable, under the control of the controller 10, to display images to a user of the apparatus 1.

In FIG. 1, the apparatus 1 also comprises a user-interface 16. The user-interface 16 is operable to receive user inputs and to send signals indicative of these to the controller 10. The controller 10 is responsive to receipt of these to cause operations to be performed. The user-interface 16 may be of any suitable type such as, but not limited to, a touch-sensitive transducer, which may be coupled to the display 15 to form a touchscreen, a keypad, a trackball, a scroll wheel or a voice interface.

The controller 10 is operable to process the first and second image data. Subsequent to processing the first and second image data, the controller 10 is operable to cause an image resulting from the processing of the first and second image data to be displayed on the display 15. The controller 10 is operable also to store image data resulting from the processing of the first and second image data in the at least one memory 12. The storage of the image data and/or the display of the image may be performed in response to receipt of a user input via the user-interface 16.

Although not shown in FIG. 1, the first and second camera modules 13, 14 are arranged either side of an axis about which the first camera module 13 is rotatable relative to the second camera module 14. The rotation is relative and as such, in some examples, the first camera module 13 and the second camera module 14 may both be rotated in opposite directions about the axis.

In some examples, the apparatus 1 also comprises one or more sensors 17. The one or more sensors 17 are operable to determine an angle and/or a direction of the relative rotation of the first camera module 13 with respect to the second camera module 14. The one or more sensors 17 are operable to provide signals indicative of the angle and/or the direction of rotation to the controller 10. The one or more sensors may comprise, for example, strain gauges.

Figure 2A:
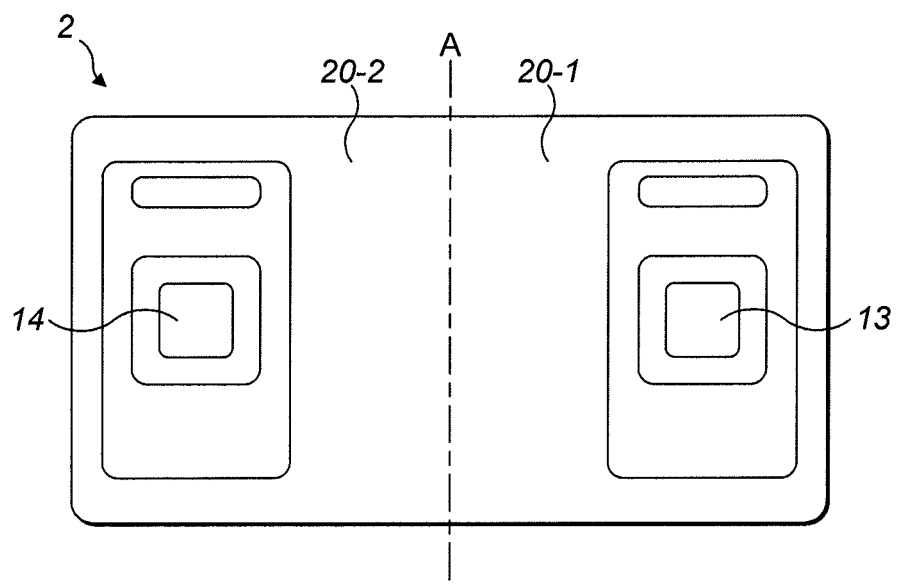
FIGS. 2A to 2C depict first and second surfaces and a side-view respectively of a device according to example embodiments of the invention.
Figure 2B:
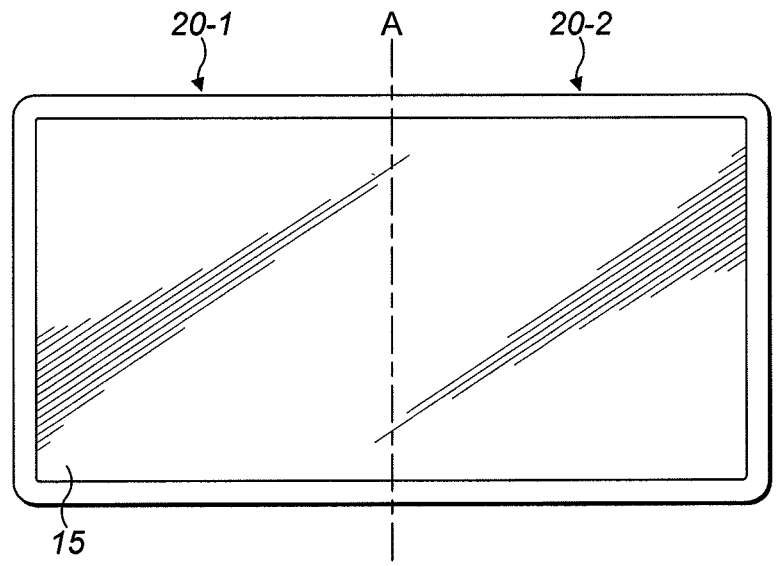
Figure 2C:
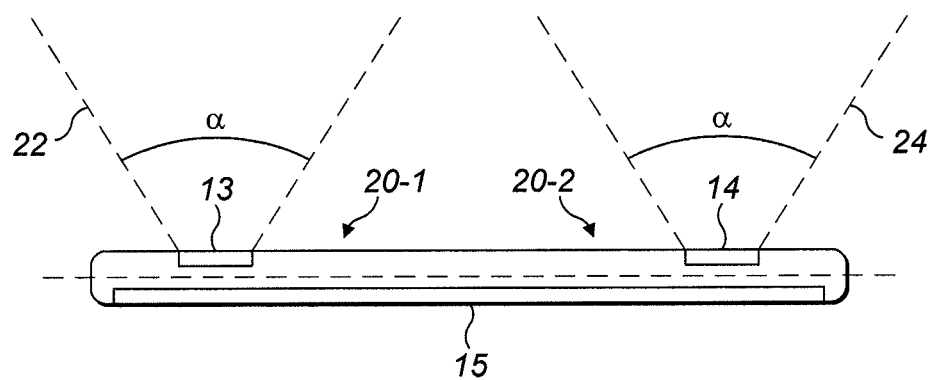

FIGS. 2A to 2C depict three different views of a device 2 according to example embodiments of the invention. More specifically, FIGS. 2A to 2C depict views of a first main surface, a second main surface and a side of the device 2 respectively.

The device 2 comprises some or all of the components of the apparatus 1 shown in FIG. 1. In addition, the device 2 comprises a device body 20-1, 20-2 in, or on, which the components of the apparatus 1 of FIG. 1 are provided. The device body 20-1, 20-2 comprises a first body portion 20-1 in which the first camera module 13 is located and a second body portion 20-2 in which the second camera module 14 is located. In other words, the first camera module 13 is fixed to the first body portion 20-1 and the second body portion 20-2 is fixed to the second body portion 20-2.

The axis, either side of which the first and second camera modules 13, 14 are provided and about which the first camera module 13 is rotatable relative to the second camera module 14, is shown by the dashed line and the reference A. The display 15 is provided on an opposite surface of the device 2 to that on which the first and second camera modules 13, 14 are visible.

FIG. 2C depicts a side view of the device 2. The field of view 22, 24 of the first and second camera modules 13, 14 are denoted by dashed lines extending from the camera modules 13, 14. The fields of view 22, 24 represent volumes of space that can be captured by the respective camera modules 13, 14 to produce an image. The angles of view (i.e. the angles at which the fields of view 22, 24 extend from the camera modules 13, 14) are denoted by the character "$\alpha$". In this example, the angles of view for the first and second camera modules are the same.

The device of FIGS. 2A to 2C is flexible. Consequently, the user can apply a bending force to cause the device 2 to become curved. As the device 2 becomes curved, the first camera module 13 is rotated relative to the second camera module 14. Flexible devices are known to the person skilled in the art and so a detailed explanation is not provided herein. The bending of the device 2 and the consequential rotation of the first camera module 13 relative to the second camera module 14 is illustrated in FIGS. 3A and 3B.

Figure 3A:
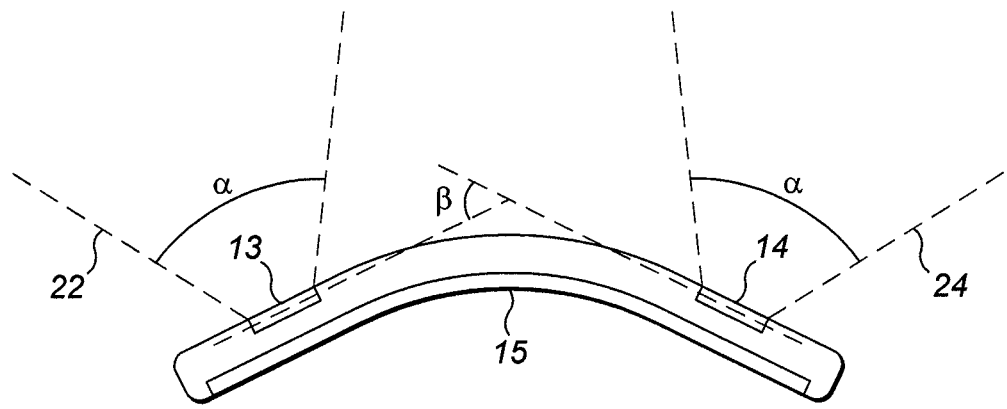
FIGS. 3A and 3B are side-views of the device of FIGS. 2A to 2C when being convexly bent and concavely bent respectively.

In FIG. 3A, the device 2 has been bent such that the first camera module 13 is rotated relative to the second camera module 14 by an angle $\beta$. The direction of rotation is anti-clockwise. It will be appreciated, however, that the direction of rotation depends on the perspective of the person viewing the device 2 when it is curved. As a result of the bending of the device 2, the fields of view 22, 24 of each of the first and second camera modules 13, 14 are shifted in a direction away from one another (or away from a central point of the device 2). Hereinafter, the direction of rotation that causes the fields of view to be shifted in a direction away from one another is called "the first direction of rotation".

Figure 3B:
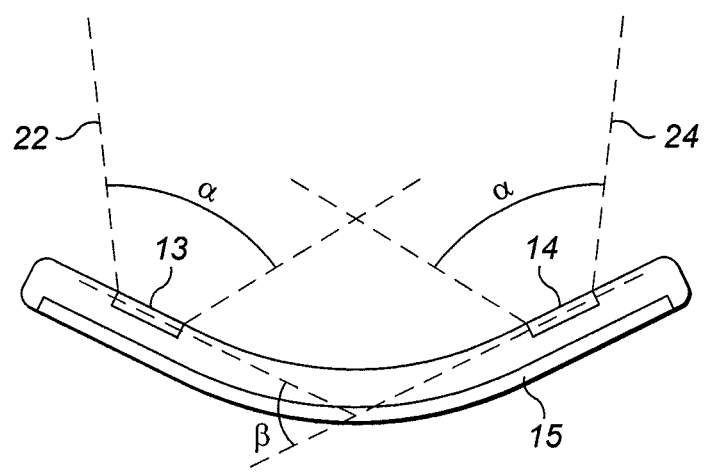

FIG. 3B depicts the device 2 when it has been bent such that the first camera module 13 is rotated relative to the second camera module 14 by an angle $\beta$. The direction of rotation is clockwise. As a result of the bending of the device 2 as shown in FIG. 3B, the fields of view 22, 24 of each of the first and second camera modules 13, 14 are shifted in a direction towards one another (or towards a central point of the device 2). Hereinafter, the direction of rotation that causes the fields of view to be shifted in a direction towards one another is called "the second direction of rotation".

Figure 4A:
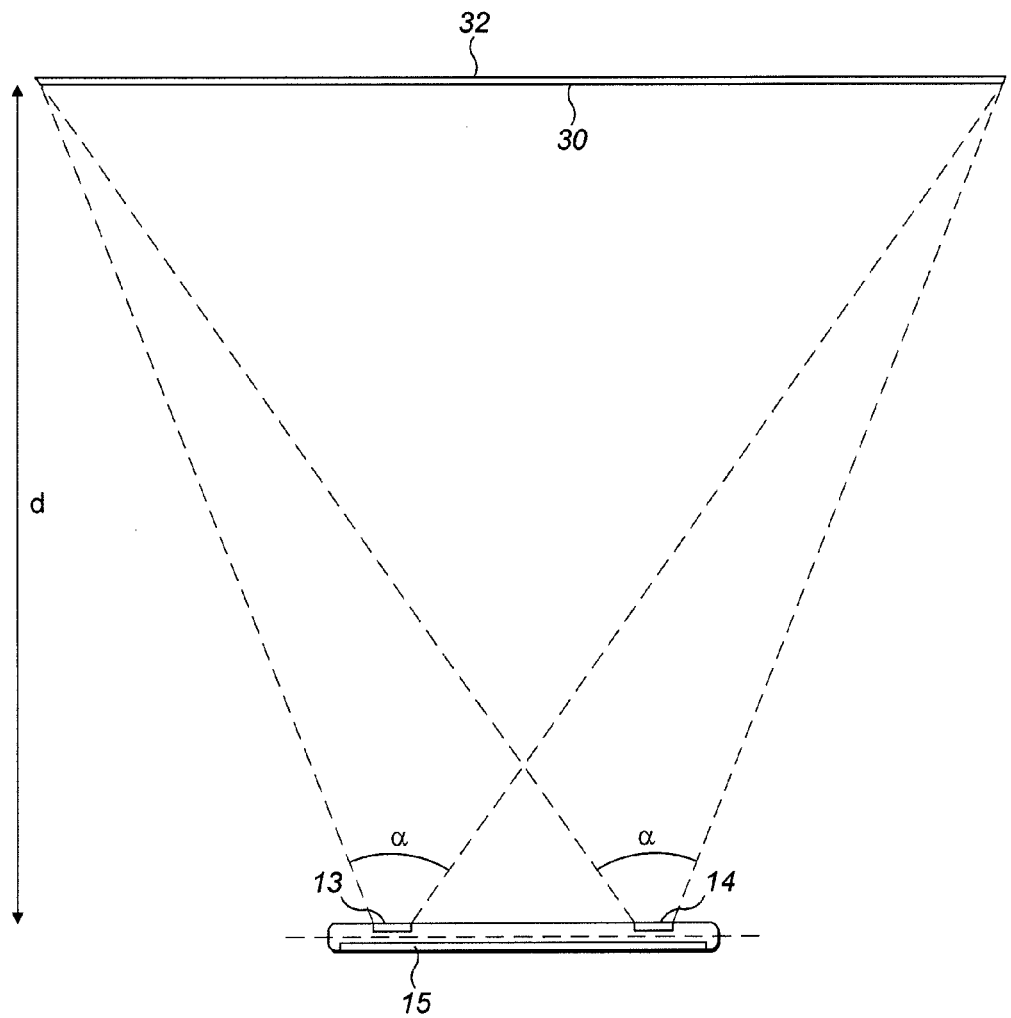
FIGS. 4A and 4B illustrate the fields of view of each of the first and second camera modules and the alignments of the first and second images when the first camera module of the device of FIGS. 2 and 3 is in a non-rotated state relative to the second camera module.
Figure 4B:
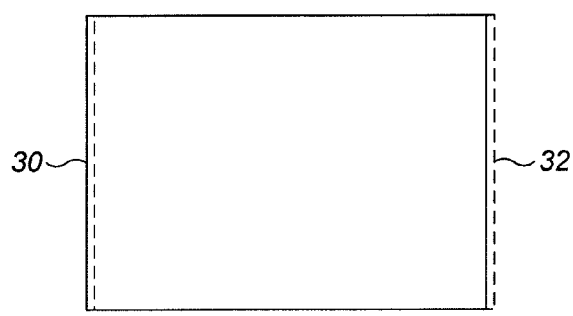

FIGS. 4A and 4B depict the relative locations of the fields of view 22, 24 of the first and second camera modules 13, 14 when the first camera module 13 is in a non-rotated state relative to the second camera module 14 (i.e. when the device is not bent). As can be seen, the first and second camera modules 13, 14 are arranged within the device 2 such as at a particular distance from the device 2, the fields of view substantially entirely overlap. Consequently, the first and second camera modules 13, 14 produce substantially the same image data, when the first camera module 13 is in a non-rotated state relative to the second camera module 13. In other words, the first image 30 (i.e. the image that is captured by the first camera module 13) substantially entirely overlaps with the second image 32 (i.e. the image that is captured by the second camera module 14). This can be seen in FIG. 4B, which shows the relative alignments of the first and second images 30, 32. When the first camera is in a non-rotated state relative to the second camera, the first and second images 30, 32 are substantially aligned in both the vertical and horizontal directions (i.e. in both the x and y dimensions).

Although not shown in FIGS. 4A and 4B, the controller 10 is operable to receive the first image data and the second image data and to combine these into a single image, hereafter called the third image. The controller 10 may be operable to cause the third image to be displayed on the display 15 and/or to cause third image data which is representative of the third image to be stored in the at least one memory 12 for later retrieval.

The fact that the first and second images 30, 32 almost entirely overlap when there is no relative rotation of the first and second camera modules means that the resulting third image may have better sensitivity and may include less noise than each of the individual first and second images 30, 32. In addition, this allows the device 2 to create better quality images when the light level is low. Furthermore, combining two images of same resolution enables production of a resulting image that has potentially twice the resolution of the two original images. This is because the two images will always be slightly different, due to the slightly different positions of the two camera modules. As such, the two images together include more information together than either of the images alone. Resolution enhancement can then be carried out using so called super-resolution techniques. Also, the overlap of the first and second images 30, 32 allows the creation of stereoscopic images.

The distance at which the fields of view of the first and second camera modules 13, 14 entirely overlap may be varied by changing the focal length of the first and second camera modules 13, 14.

Figure 5A:
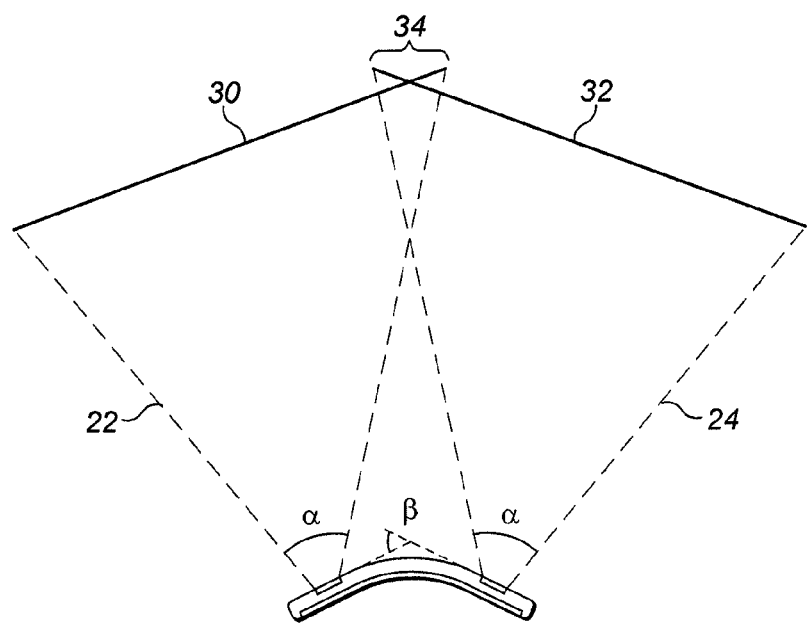
FIGS. 5A to 5C illustrate the fields of view of the first and second camera modules and the alignments of the first and second images when the first camera module is rotated in a first direction relative to the second camera module.
Figure 5B:
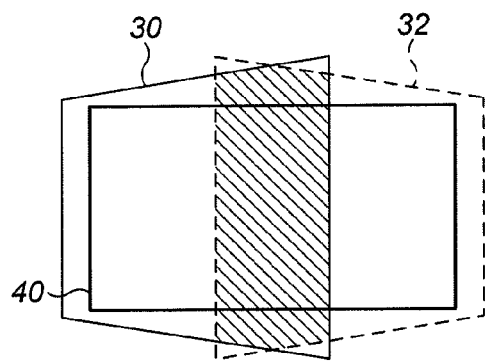
Figure 5C:
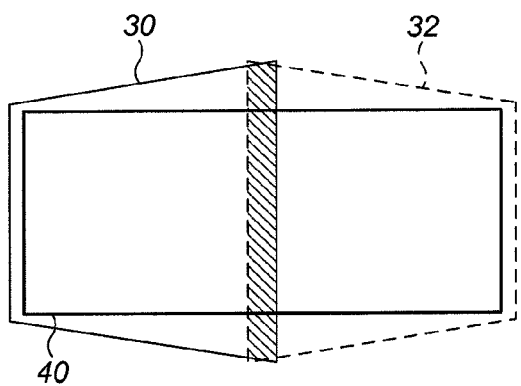

FIGS. 5A to 5C illustrate how the fields of view 22, 24 and the relative alignments of the first and second images 30, 32 shift in the horizontal direction as the device 2 is bent such that the first camera module 13 is rotated in the first direction relative to the second camera module 14. As can be seen from FIG. 5A, relative rotation in the first direction causes the first image 30 to move to the left and the second image 32 to move to the right. As such, as the angle of rotation β increases, the regions of the first and second images that overlap with each other decrease in size.

FIG. 5B illustrates how the third image 40 is generated based on the first and second image data when the relative rotation is in the first direction. In FIGS. 5B and 5C, the first image 30 is depicted by the solid line while the second image 32 is depicted by the dashed line. The third image 40 is depicted by the thicker solid line.

When the direction of rotation is detected to be in the first direction, the controller 10 is operable to process the first and second image data to generate a third image which is a "panoramic combination" of the first and second images. In other words, when rotation in the first direction is detected, the third image 40 that is generated by the controller 10 includes at least part of the overlapping regions of the first and second images (which is shown as the shaded area in FIGS. 5B and 5C), in addition to a non-overlapping region of the first image 30 and a non-overlapping region of the second image 40.

The portion of the third image which is representative of at least a part of the overlapping regions of the first and second images may be generated by combining corresponding portions of the overlapping regions of the first and second images 30, 32. Portions of the overlapping regions of the first and second images 30, 32 are said to be corresponding if they include the same features. In these embodiments, the overlapping regions may be blended together using, for example, Poisson blending with gradient mixing.

In alternative embodiments, the portion of the third image 40 which is representative of the overlapping regions of the first and second images 30, 32 may be generated using the overlapping region of just one of the first and second images 30, 32.

As described with reference to FIG. 1, in some embodiments the apparatus 1 includes at least one sensor 17 for detecting the direction and/or the relative angle of rotation of the camera modules 13, 14. In such embodiments, the controller 10 is operable to use this information when generating the third image data. For example, the controller 10 may be operable to compute the simple alignment cross-function of the first and second images 30, 32 and to use a pixel level point of interest detection algorithm. An example of such an algorithm is the Moravec corner detection algorithm, which uses a sum of squared differences (SSD) approach to detecting points overlapping points of interest in two images. In other embodiments, in which the apparatus 1 does not include one or more sensors 17, a feature level algorithm such as a scale/invariant feature transform (a SIFT), may be used to align the first and second images. The feature level algorithm may also be used to determine the direction and/or angle of rotation.

As can be seen in FIG. 5A, the relative rotation of the first camera module 13 causes the planes of the first and second images 30, 32 no longer to coincide (as they do when the first camera module is in a non-rotated state), but instead to be at an angle to one another. Consequently, in order to address this, after the first and second images 30, 32 have been aligned, the controller 10 processes the first and second image data, such that it appears to be in the same plane. This may involve, for example, causing the image features that are at the outside edges of the first and second images 30, 32 to appear further away and to cause the image features that are closer to, or part of the overlapping regions, to appear closer. This is referred to hereafter as image-plane-angle compensation.

In some examples, when aligning the first and second images, the processor may be operable to warp the second (or the first) image such that the features common to both images are substantially the same size and in substantially the same relative location. Subsequently, during image-plane-angle compensation, both images may be warped backwards by half of an inverse of the warp algorithm that was applied to the second (or first) image during alignment.

Subsequent to alignment and projection processing, the controller 10 is operable to crop the combined images to generate the third image 40. The controller 10 is configured to crop the combined first and second images 30, 32 to obtain a rectangle or another predefined shape that falls within the area of the combined images. For example, the controller 10 may be operable to select the largest rectangular area from the combined first and second images and present this as the third image 40. It will be appreciated, however, that the third image may be of a different shape and/or may be smaller than the largest size that fits within the area of the combined images.

FIG. 5B depicts the first and second images 30, 32 and the resulting third image 40 at a first angle of rotation β in the first direction. FIG. 5C depicts the first and second images 30, 32 and the resulting third image 40 at a second, increased angle of rotation β in the first direction. As can be seen, the third image is wider, and may be referred to as a "panoramic image". In addition, the widths of the overlapping regions of the first and second images 30, 32 are significantly reduced.

It will be appreciated that there may be a value at which the angle of rotation β becomes so large that the overlapping regions are too narrow for the controller 10 to be able to satisfactorily combine them. When this occurs, the controller 10 may be operable to alert the user that the angle of rotation 10 is too large. This may be performed in any suitable way, for example by causing an indicator to be displayed on the display.

It will also be appreciated that there is also a threshold angle β at which the two images will no longer overlap at all. This occurs when the angle of rotation β is equal to the angle of view α of the camera modules 13, 14 (i.e. when β=α).

Figure 6A:
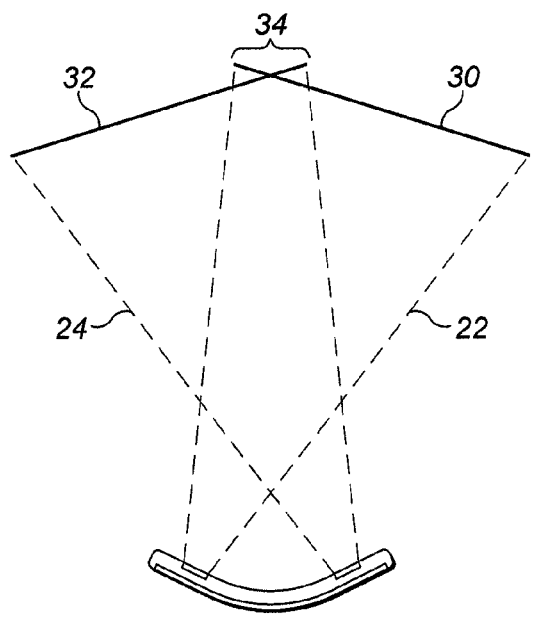
FIGS. 6A to 6C illustrate the fields of view of the first and second camera modules and the alignments of the first and second images when the first camera module is rotated in a second direction relative to the second camera module.
Figure 6B:
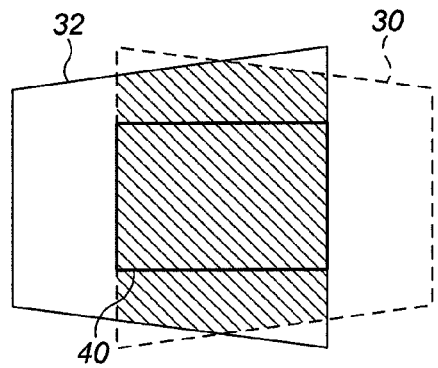
Figure 6C:
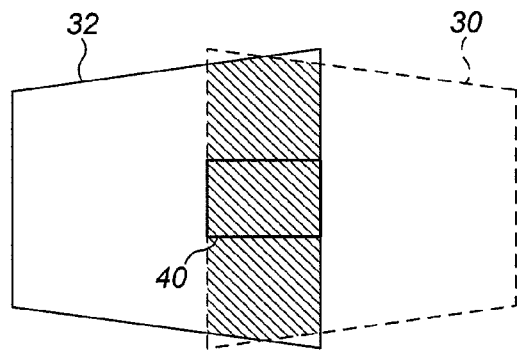

FIGS. 6A to 6C illustrate how the fields of view 22, 24 and the relative alignments of the first and second images 30, 32 shift in the horizontal direction as the device 2 is bent such as that the first camera module 13 is rotated in the second direction relative to the second camera module 14. As can be seen from FIG. 6A, relative rotation in the second direction causes the first image 30 to move to the right and the second image 32 to move to the left. As such, as the angle of rotation β in the second direction increases, the regions of the first and second images that overlap with each other decrease in size. The first and second images remain vertically aligned regardless of the angle of rotation.

FIG. 6B illustrates how the third image 40 is generated based on the first and second image data when the relative rotation is in the second direction. In FIGS. 6B and 6C, the first image 30 is depicted by a dashed line while the second image 32 is depicted by the solid line. The third image 40 is depicted by the thicker solid line.

When the direction of rotation is detected to be in the second direction, the controller 10 is operable to process the first and second image data to generate a third image which is a "zoomed image" and which includes only corresponding portions of the overlapping regions (which are shaded in FIGS. 6B and 6C) of the first and second images 30, 32.

The controller 10 is responsive to the detection of a rotation of the first camera module 13 relative to the second camera module 14 in a clockwise direction to process the first and second image data and to generate the third image which includes only corresponding portions of the overlapping regions of the first and second images. As described with reference to FIGS. 5B and 5C, the corresponding portions of the overlapping regions may be blended together or, alternatively, a portion of the overlapping region of just one of the first and second images may be used when generating the third image.

The controller 10 is operable also to retain a constant aspect ratio for the third image as the angle of rotation β in the second direction increases. The maximum width, in pixels, of the third image is dictated by the width of the overlapping regions of the first and second images 30, 32. The width of the overlapping regions is itself dictated by the angle of rotation β of the first camera module 13 relative to the second camera module 14. This can be seen in FIG. 5C which shows the first, second and third images 30, 32, 40 that result from an increased angle of rotation in the second direction. The controller 10 is operable to keep the aspect ratio constant by reducing the height, in pixels, of the third image 40 at the same rate as the width of the overlapping regions is decreased (which is also the rate at which the angle of rotation β in the second direction is increased).

Although the pixel area (i.e. the width in pixels x the height in pixels) of the third is reduced as the angle of rotation β in the second direction is increased, the controller 10 is operable to scale the third image up to a standard size before it is displayed on the display 15 or is stored in the memory 12. Consequently, as the angle of rotation β in the second direction increases, the controller 10 effectively increases the "digital zoom factor" of a portion of the overlapping regions of the first and second images 30, 32. In other words, the controller 10 is responsive to the detection of rotation of the first camera module 13 in the second direction to cause a zoomed image to be stored in the at least one memory 12 and/or to be displayed on the display 15.

Similarly to as described with reference to FIGS. 5A to 5C, there may be a value at which the angle of rotation β becomes so large that the overlapping regions are too narrow for the controller 10 to be able to combine them and to produce a satisfactory image. When the angle of rotation reaches this value, the controller 10 may be operable to alert the user that the angle of rotation 10 is too large. This may be performed in any suitable way, for example by causing an indicator to be displayed on the display.

It will also be appreciated that there is also a threshold angle β at which the two images will no longer overlap at all. This occurs when the angle of rotation β is equal to the angle of view α of the camera modules 13, 14 (i.e. when β=α).

Figure 7A:
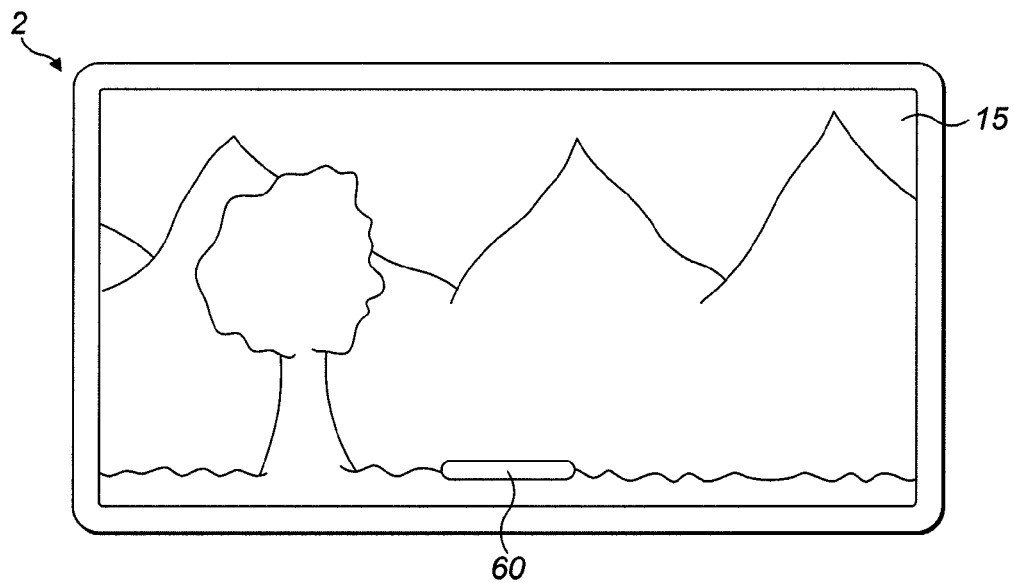
FIGS. 7A and 7B depict the state of the display of the device of FIGS. 2A to 2C as the angle of rotation of the first camera module relative to the second camera module in the first direction is increased.
Figure 7B:
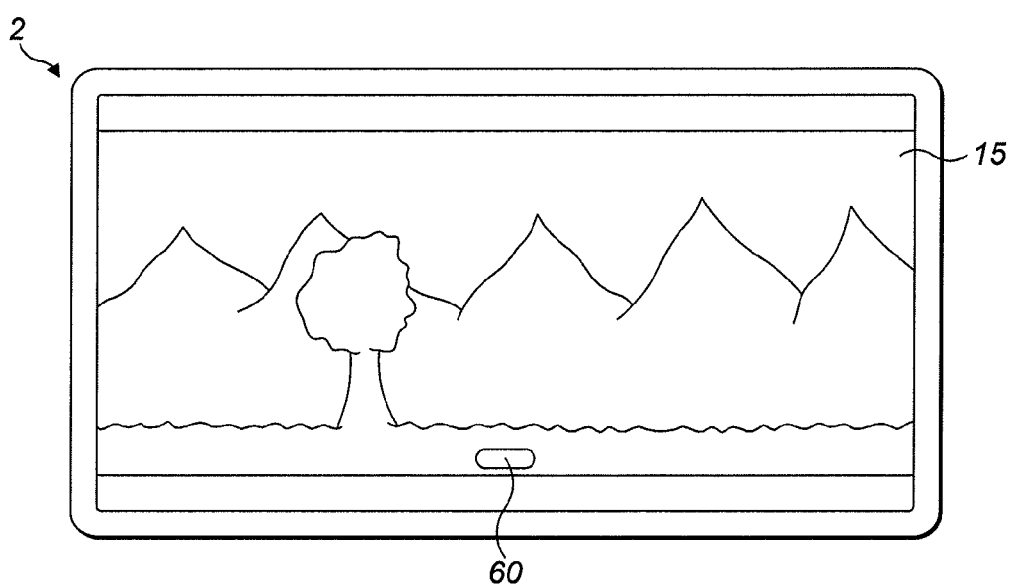

FIGS. 7A and 7B illustrate the changes in the third image when displayed on the display, as the angle of the rotation β of the first camera module 13 relative to the second camera module 14 in the first direction is increased. FIG. 7A depicts an example of the third image 40 that is caused to be displayed on the display 15 when the angle of the rotation β is at a first value and FIG. 7B depicts the third image 40 when the angle β is increased to a second, higher value. It can be seen that the width of a scene that is present in the third image 40 increases as the angle of rotation increases.

As can be seen from FIGS. 7A and 7B, the controller 10 is operable to display 15 a graphic 60 on the display 15 that is indicative of the angle of rotation β of the first camera module 13 relative to the second camera module 14. In the examples shown in FIGS. 7A and 7B, the graphic 60 is indicative of the width of the overlapping regions of the first and second images. Consequently, in FIG. 7B when the angle of rotation β is increased to the second, higher value, the graphic 60 indicates a reduced width of the overlapping regions. In alternative examples, the graphic may have any suitable appearance that allows the angle of rotation β to be communicated to the user.

Although not shown in FIGS. 7A and 7B, the controller 10 may be operable to alert the user when the angle of rotation is approaching the angle at which the controller 10 becomes unable to combine satisfactorily the first and second images 30, 32. The controller 10 may alert the user in any suitable way, for example, by changing the colour of the graphic 60.

Figure 8A:
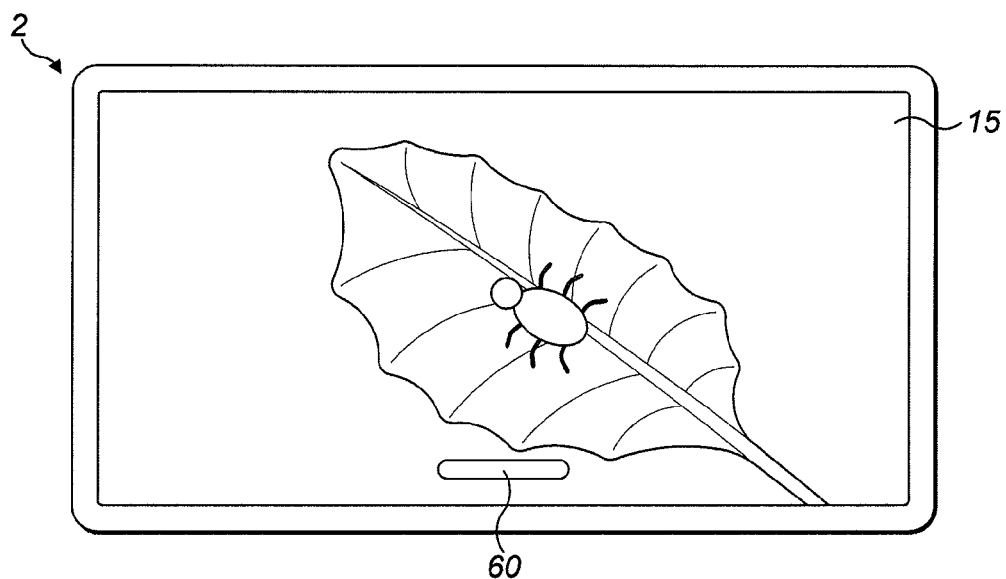
FIGS. 8A and 8B depict the state of the display of the device of FIGS. 2A to 2C as the angle of rotation of the first camera module relative to the second camera module in the second direction is increased.
Figure 8B:
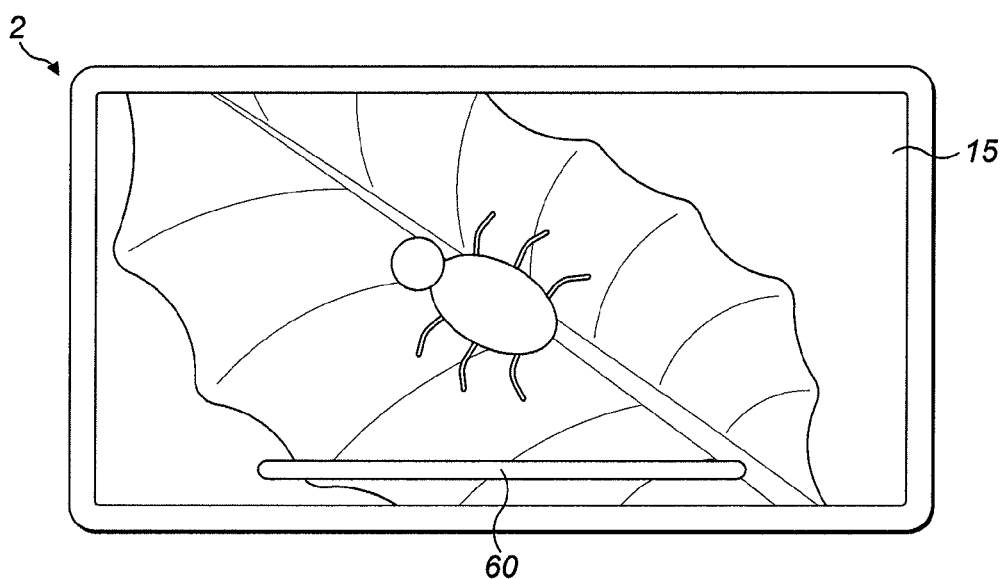

FIGS. 8A and 8B illustrate the changes in the third image when displayed on the display, as the angle of the rotation β of the first camera module 13 relative to the second camera module 14 in the second direction is increased. As such, the image in FIG. 8B appears to be magnified compared to the image in FIG. 8A.

The controller 10 is operable to cause the graphic 60 to be displayed on the display 15 to indicate the angle of rotation β currently applied to the first camera module 13. In this example, the graphic comprises a bar which increases in length as the angle of rotation β, and thus also the magnification, increases. The controller 10 may be operable also to alert the user when the threshold angle is about to be reached. This may be performed by changing the appearance of the graphic, for example by changing its colour.

In the above described embodiments, the device 2 is bent by the user in order to rotate the first camera module 13 relative to the second camera module 14. This bending also results in the display 15 being bent. The effect of the display 15 being bent is that, when viewed by the user, the third image displayed on the display 15 may appear distorted. In view of this, in some example embodiments, the controller 10 is operable to process the third image data to produce fourth image data. The fourth image data is a distorted version of the third image data which, when it is displayed on a curved display, appears undistorted.

Figure 9A:
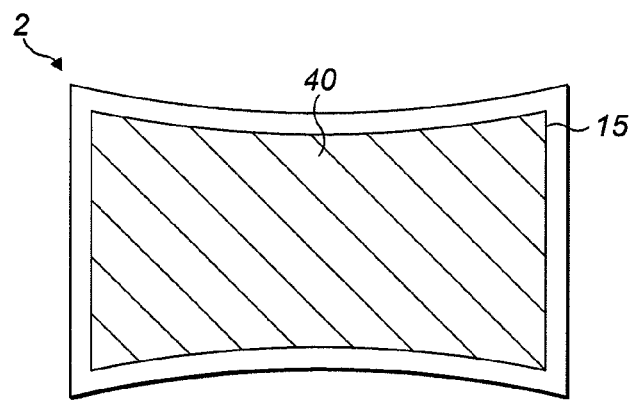
FIGS. 9A and 9B illustrate a way in which an image displayed on the display may be distorted to compensate for curvature of the display resulting from the rotation in the first direction of the first camera module relative to the second camera module.
Figure 9B:
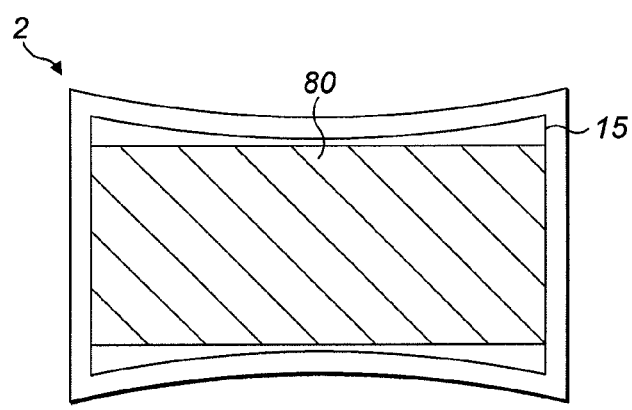
Figure 9C:
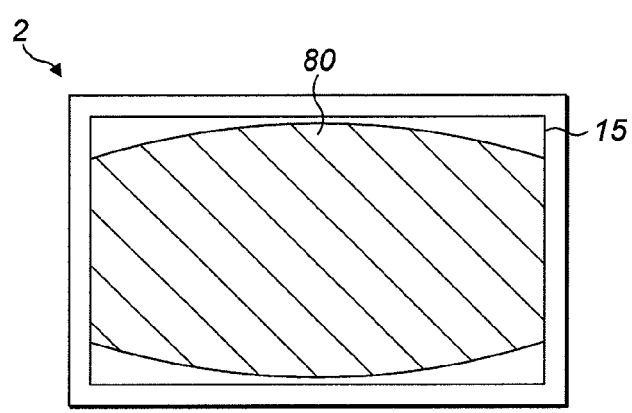
FIG. 9C illustrates an appearance of a fourth image as the fourth image may be displayed on a flat display to compensate for a concave curvature of the flat display.

The controller 10 is operable to distort the third image data based on the angle and direction of rotation of the first camera module 13 relative to the second camera module 14. More specifically, as the angle of rotation increases so too does the level of distortion applied to the third image data when generating the fourth image data. FIGS. 9A to 9C illustrate the way in which the distortion is applied to the third image data when generating the fourth image.

In FIG. 9A, the angle of rotation of the first camera module 13 relative to the second camera module 14 is in the first direction. As such, the display 15 is curved in a concave manner. The third image 40 as displayed on the display 15 before processing to generate the fourth image 80 is shown in FIG. 9A. As can be seen, the concave curvature of the display 15 causes the top and bottom edges of the third image 40 to appear to be concavely curved.

FIG. 9B shows the fourth image 80 displayed on the concavely curved display 15. As can be seen, the fourth image 80 appears to the user to be rectangular (as is the third image when viewed on a flat display.

FIG. 9C shows the actual appearance of the fourth image 80 if it were displayed on a flat display 15. As can be seen, in order to compensate for the concave curvature of the display, the controller processes the third image data such that the top and bottom edges of the fourth image are convexly curved. This convex curvature of the top and bottom edges is achieved by stretching the image in the vertical direction by increasing amounts towards the centre of the image.

Figure 10A:
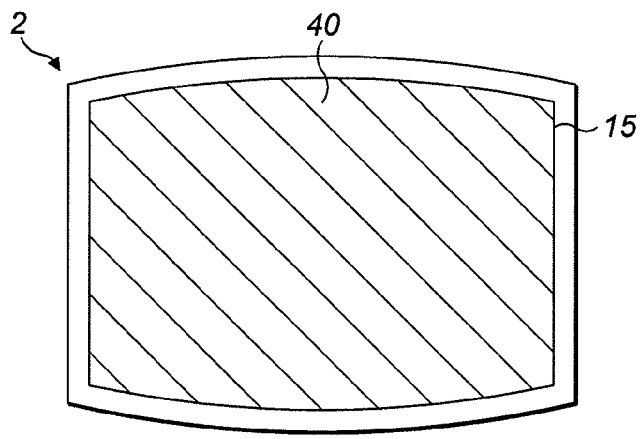
FIGS. 10A and 10B illustrate a way in which an image displayed on the display may be distorted to compensate for curvature of the display resulting from the rotation in the second direction of the first camera module relative to the second camera module.
Figure 10B:
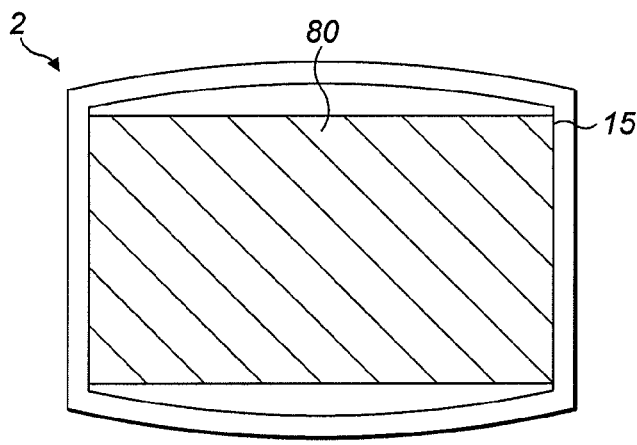
Figure 10C:
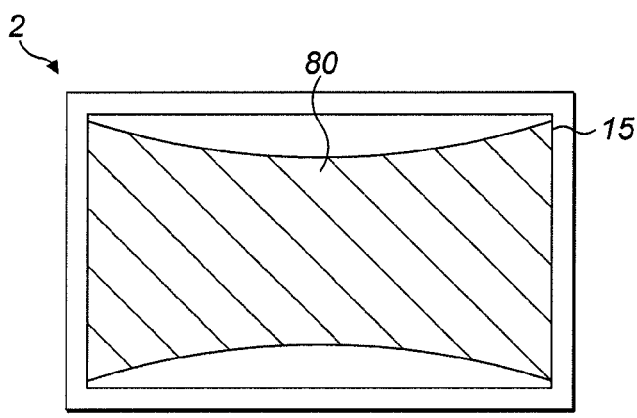
FIG. 10C illustrates a fourth image as the fourth image may be displayed on a flat display to compensate for a convex curvature of the flat display.

FIGS. 10A to 10C illustrate the distortion applied to the third image data when it is detected that the angle of rotation of the first camera module 13 relative to the second camera module 14 is in the second direction. FIG. 10A shows the third image 40 when displayed on a concavely curved display 15. The third image 40 appears to be convexly curved on both the top and bottom edges.

FIG. 10B shows the fourth image 80 when displayed on a convexly curved display 15. The fourth image 80 when displayed on the convexly curved display 15 appears to be rectangular.

Finally, FIG. 10C shows the fourth image 80 when displayed on a flat display 15. As can be seen, the convex curvature of the display has been compensated for by distorting the third image 40 such that the top and bottom edges are concavely curved. This is achieved by gradually compressing the third image 40 in the vertical direction to a maximum compression at the centre of the third image 40.

Figure 11:
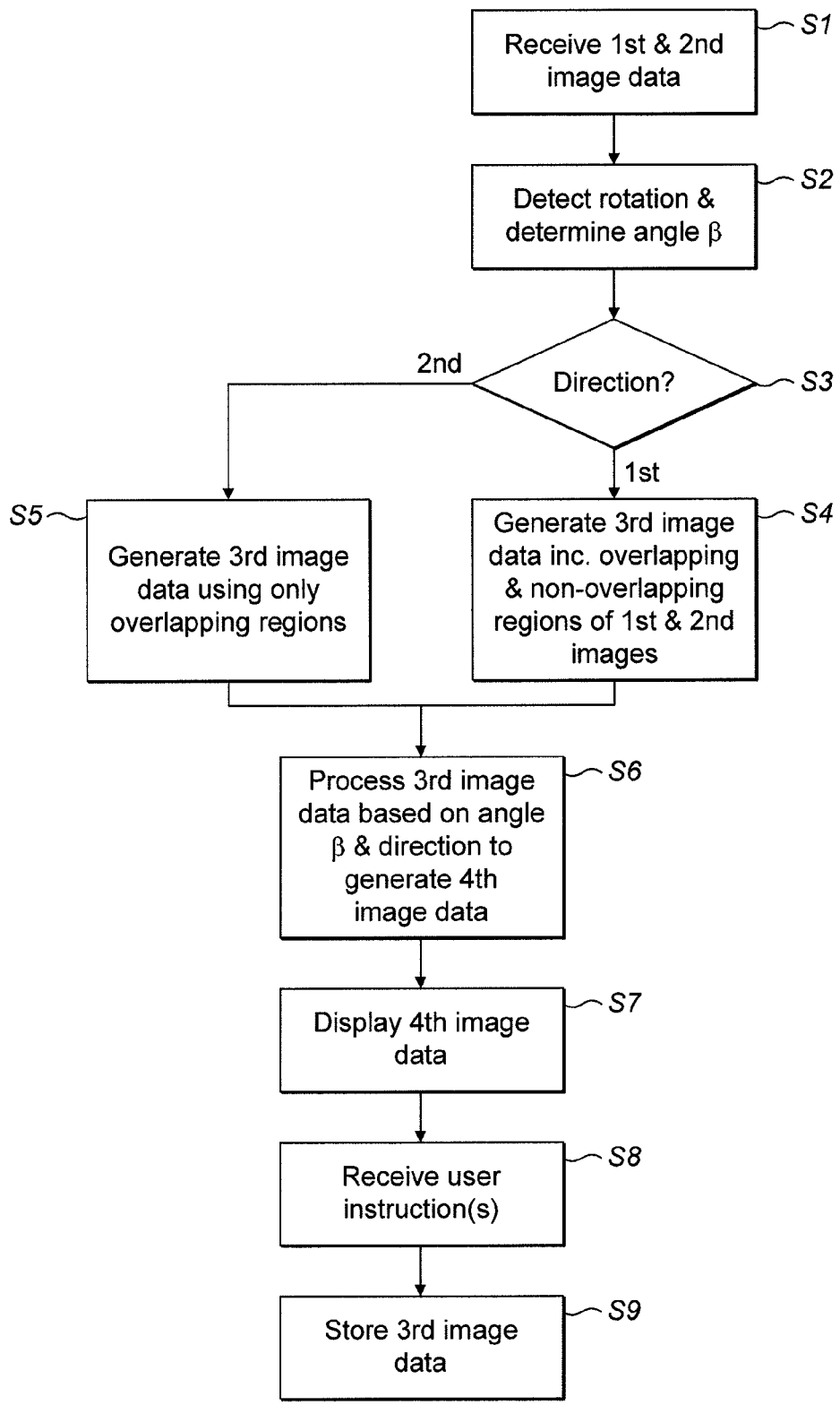
FIG. 11 is a flow chart illustrating a method according to example embodiments of the invention.

FIG. 11 is a flow diagram of a method carried out by the controller 10 according to example embodiments of the invention.

In step S1, the controller 10 receives the first image data from the first camera module 13 and the second image data from the second camera module 14.

In step S2, the controller 10 detects the rotation of the first camera module 13 relative to the second camera module 14 and determines the angle β.

In step S3, the controller 10 determines the direction of the rotation. The direction of rotation as well as the angle of rotation may be determined based on signals received from the one or more sensors 17. In alternative embodiments, the direction and angle of rotation β may be determined using feature level algorithms on the first and second image data.

If, in step S3, it is determined that the direction of rotation is in the first direction, the controller 10 proceeds to step S4. In step S4, the controller 10 processes the first and second image data to generate a third image 40 which comprises overlapping regions of the first and second images 30, 32 in addition to non-overlapping regions of the first and second images 30, 32.

If, in step S3, it is determined that the rotation of the first camera module 13 relative to the second camera module 14 is in the second direction, the controller 10 processes the first and second image data to generate a third image 40 comprising only corresponding portions of the overlapping regions of the first and second images 30, 32.

Subsequent to either of steps S4 and S5, the controller 10 proceeds to step S6. In step S6, the controller 10 processes the third image data based on the direction of rotation and the angle of rotation β to generate fourth image data. The fourth image data is distorted such that when the fourth image (of which the fourth image data is representative) is displayed on a curved display 15 it appears to be correctly proportioned.

Next, in step S7, the controller 10 causes the fourth image 80 to be displayed on the display 15. In addition, the controller 10 causes the graphic 60 indicative of the angle of rotation β also to be displayed on the display 15.

In step S8, the controller 10 receives from the user-interface 16 a signal indicative of a user instruction. In response to this, in step S9, the controller 10 causes the third image data to be stored in the at least one memory 12.

In some example embodiments, the controller 10 is operable to detect a sudden bending of the device and to respond by causing the third image that was generated immediately prior to the sudden bending to be stored in the at least one memory 12. Sudden bending may be identified when the rate of change of the angle of rotation β exceeds a predetermined threshold. In other words, the controller 10 may be operable to detect when the rate of change of the relative angle of rotation is in excess of a predetermined threshold and may respond by causing the third image that was generated immediately prior to detection of the rate of change in excess of the predetermined threshold to be stored in the at least one memory 12 and/or to be displayed on the display 14.

Figure 12A:
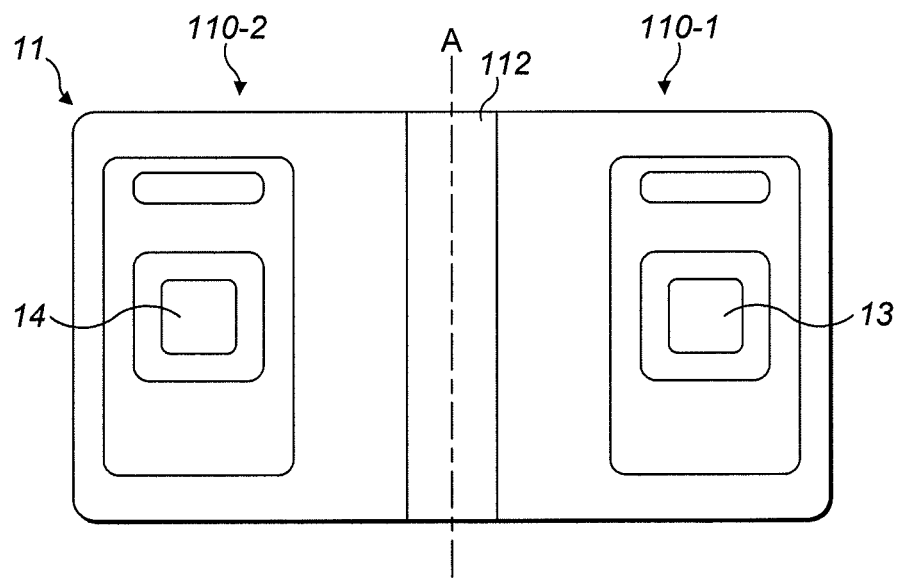
FIGS. 12A to 12D depict views of a device according to alternative example embodiments.
Figure 12B:
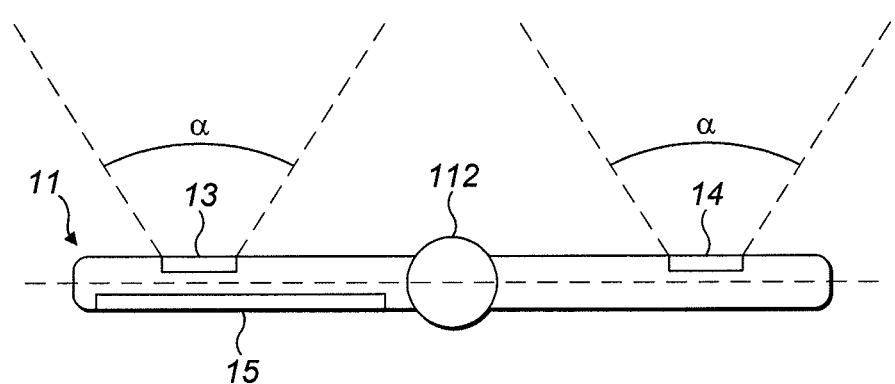

FIGS. 12A to 12D show a device 100 according to alternative example embodiments of the invention. In this example, the device 110 is not flexible but instead comprises first and second body portions 110-1, 110-2 which are foldable about a hinge 112 provided therebetween. As with the example of FIG. 2, the first camera module 13 is provided in the first body portion 110-1 and the second camera module 14 is provided in the second body portion 110-2. A display 15 may be provided on an opposite surface of one or both of the first and second body portions 110-1, 110-2 to that on which the camera modules 13, 14 are provided. In FIG. 12B, the display 15 is provided on a surface of a first body portion 14.

Figure 12C:
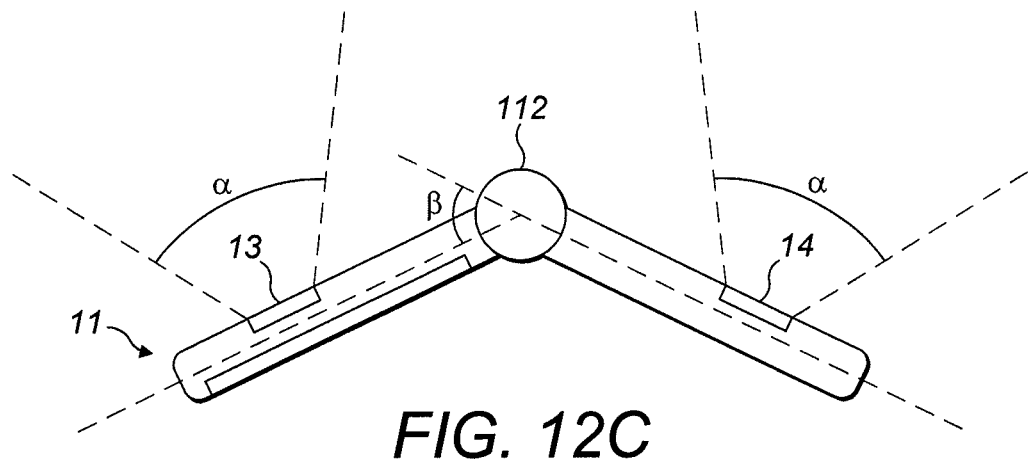
Figure 12D:
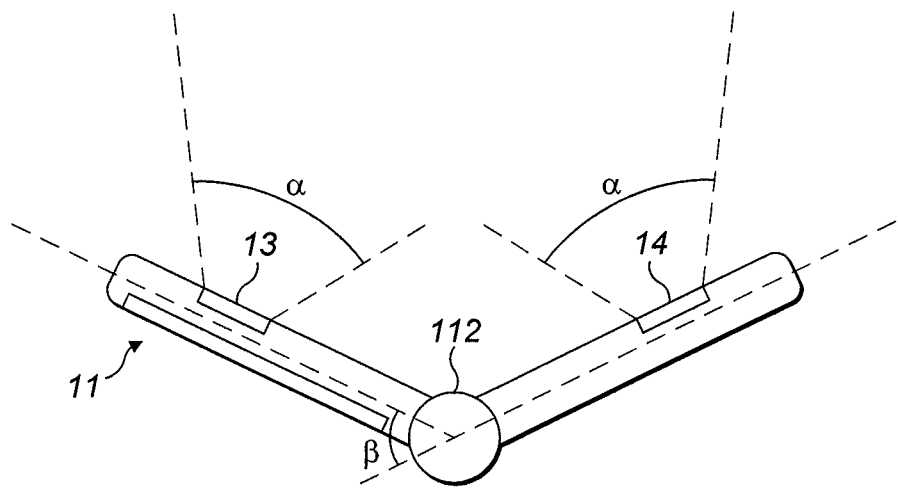

FIGS. 12C and 12D show the device 110 following rotation of the first camera module 13 relative to the second camera module 14 in the first and second directions respectively. In this embodiment the axis about which the first camera module 13 rotates relative to the second camera module 14 is co-linear with the longitude axis of the hinge.

In some example embodiments, the apparatus 1 may comprise more than two camera modules. In embodiments with an even number of camera modules, the modules may be evenly spaced either side of the axis A. In embodiments with an odd number of camera modules, one module may be provided on the axis about which the other modules rotate.

The above examples may be provided with indicators for indicating the field of view provided by the device in a given configuration. For instance, the indicators may take the form of light sources, for instance lasers, that are aligned with the outside edges of the field of view, for instance the leftmost edge of 22 and the rightmost edge of 25. In this way, a user is provided with information when looking at the scene as to the field of view that will be captured by the camera.

It will be appreciated that the display technology described above is merely illustrative. Semi-transparent displays may be used in some embodiments. In some other embodiments, the apparatus 1 may provide a double-sided display. Any other suitable display technology may alternatively be used.

In the above example embodiments, the controller 10 is responsive to detection of relative rotation in the first direction to produce a so-called panoramic image and is responsive to detection of relative rotation in the second direction to produce a zoomed or magnified image. It will be appreciated however that the controller 10 could instead be responsive to relative rotation in the first direction to produce a zoomed or magnified image and responsive to relative rotation in the second direction to produce a panoramic image.

Although the above example embodiments are described with reference to still imaging, it will be appreciated that the embodiments of the invention may instead produce panoramic and magnified video images.

It should be realized that the foregoing embodiments should not be construed as limiting. Other variations and modifications will be apparent to persons skilled in the art upon reading the present application. Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. Apparatus comprising:
at least one processor;
at least one memory having computer-readable code stored thereon;
a first camera module configured to provide first image data representative of a first image;
a second camera module configured to provide second image data representative of a second image,
wherein the first and second camera modules are arranged either side of an axis about which the first camera module is rotatable relative to the second camera module, and are arranged such that, when the first camera module is rotated relative to the second camera module by less than a threshold angle, a region of the first image overlaps a region of the second image,
wherein the computer-readable code, when executed by the at least one processor, causes the at least one processor:
to process the first image data and the second image data; and
to generate third image data representative of a third image, the third image representing at least corresponding portions of the overlapping regions of the first and second images,
wherein the apparatus is a flexible device, the first camera module being fixed to a first portion of the flexible device and the second camera module being fixed to a second portion of the flexible device, wherein the first camera module is rotatable relative to the second camera module by bending the flexible device along an axis between the first and second portions of the device to cause the device to become curved, wherein the flexible device includes a flexible display, and wherein bending the device along the axis between the first and second portions of the device causes the flexible display to become curved.

2. The apparatus of claim 1, wherein the computer-readable code, when executed by the at least one processor, causes the at least one processor:
to detect rotation of the first camera module relative to the second camera module; and
to be responsive to the detection of rotation to generate the third image data such that it is also representative of at least a portion of a non-overlapping region of the first image and at least a portion of a non-overlapping region of the second image.

3. The apparatus of claim 1, wherein the computer-readable code, when executed by the at least one processor, causes the at least one processor:
to detect rotation of the first camera module relative to the second camera module; and
to be responsive to the detection of rotation to generate the third image data such that it is representative of only the corresponding portions of the overlapping regions of the first and second images.

4. The apparatus of claim 3, wherein the computer-readable code, when executed by the at least one processor, causes the at least one processor:
to detect an angle of rotation of the first camera module relative to the second camera module; and
as the angle of rotation increases, gradually to reduce, in a first dimension, a size of the corresponding portions of the overlapping regions of the first and second images which are represented by the third image data.

5. The apparatus of claim 1, wherein the computer-readable code, when executed by the at least one processor, causes the at least one processor:
to detect rotation of the first camera module relative to the second camera module; and
to determine a direction of rotation;
if the rotation is in a first direction, to generate the third image data such that it is also representative of at least a portion of a non-overlapping region of the first image and at least a portion of a non-overlapping region of the second image; and
if the rotation is in a second direction, to generate the third image data such that it is representative of only the corresponding portions of the overlapping regions of the first and second images.

6. The apparatus of claim 1, wherein, the first and second camera modules are arranged such that, when the first camera module is in a non-rotated state relative to the second camera module, the first and second images do not entirely overlap.

7. The apparatus of claim 1, wherein the computer-readable code, when executed by the at least one processor, causes the at least one processor:
to determine an angle of rotation of the first camera module relative to the second camera module; and
to cause a graphic to be displayed on a display, the graphic being indicative of the angle of rotation.

8. The apparatus of claim 1, wherein the computer-readable code, when executed by the at least one processor, causes the at least one processor:
to determine an angle of rotation of the first camera module relative to the second camera module; and
to process the third image data based on the angle of rotation so as to generate fourth image data, the fourth image data representing fourth image, the fourth image being a distorted version of the third image, wherein as the angle of rotation is increased so too is the level of distortion of the fourth image.

9. The apparatus of claim 8, wherein the computer-readable code, when executed by the at least one processor, causes the at least one processor:
to determine a direction of rotation of the first camera module relative to the second camera module;
if the direction of rotation is in a first direction, to process the third image data such that the fourth image is distorted in a first way; and
if the direction of rotation is in a second direction, to process the third image data such that the fourth image is distorted in a second, different way.

10. The apparatus of claim 8, wherein the flexible device comprises a flexible display, wherein bending the flexible device along the axis causes the flexible display to become curved and wherein the computer-readable code, when executed by the at least one processor, causes the at least one processor:
to cause the fourth image to be displayed on the display.

11. The apparatus of claim 1, wherein the at least one processor is operable under the control of the computer-readable code to:
determine a rate of rotation of the first camera module relative to the second camera module;
to detect when the rate of rotation is in excess of a predetermined threshold; and
to respond to the detection by causing the third image to be stored in the at least one memory.

12. A method comprising:
providing a flexible device comprising a first camera module fixed to a first portion of the flexible device and a second camera module fixed to a second portion of the flexible device, the first camera module being configured to provide first image data representative of a first image and the second camera module configured to provide second image data representative of a second image, wherein the first and second camera modules are arranged either side of an axis about which the first camera module is rotatable relative to the second camera module by bending the flexible device to cause the flexible device to become curved, wherein the first and second camera modules are arranged such that, when the first camera module is rotated relative to the second camera module by less than a threshold angle, a region of the first image overlaps a region of the second image, processing the first image data and the second image data; and
generating third image data representative of a third image, the third image representing at least corresponding portions of the overlapping regions of the first and second images, wherein the flexible device includes a flexible display, and wherein bending the device along the axis between the first and second portions of the device causes the flexible display to become curved.

13. The method of claim 12, comprising:
detecting rotation of the first camera module relative to the second camera module; and
responding to the detection of rotation by generating the third image data such that it is also representative of at least a portion of a non-overlapping region of the first image and at least a portion of a non-overlapping region of the second image.

14. The method of claim 12, comprising:
detecting rotation of the first camera module relative to the second camera module; and
responding to the detection of rotation by generating the third image data such that it is representative of only the corresponding portions of the overlapping regions of the first and second images.

15. The method of claim 12, comprising:
detecting rotation of the first camera module relative to the second camera module; and
determining a direction of rotation;
if the rotation is in a first direction, generating the third image data such that it is also representative of at least a portion of a non-overlapping region of the first image and at least a portion of a non-overlapping region of the second image; and
if the rotation is in a second direction, generating the third image data such that it is representative of only the corresponding portions of the overlapping regions of the first and second images.

16. The method of claim 12, comprising:
determining an angle of rotation of the first camera module relative to the second camera module; and
causing a graphic to be displayed on a display, the graphic being indicative of the angle of rotation.

17. The method of claim 12, comprising:
determining an angle of rotation of the first camera module relative to the second camera module; and
processing the third image data based on the angle of rotation so as to generate fourth image data, the fourth image data representing fourth image, the fourth image being a distorted version of the third image, wherein as the angle of rotation is increased so too is the level of distortion of the fourth image.

18. The method of claim 12, comprising:
determining a direction of rotation of the first camera module relative to the second camera module;
if the direction of rotation is in a first direction, processing the third image data such that the fourth image is distorted in a first way; and
if the direction of rotation is in a second direction, processing the third image data such that the fourth image is distorted in a second, different way.

19. The method of claim 12, comprising:
determining a rate of rotation of the first camera module relative to the second camera module;
detecting when the rate of rotation is in excess of a predetermined threshold; and
responding to the detection by causing the third image to be stored in the at least one memory.

20. Apparatus comprising:
at least one processor;
at least one memory having computer-readable code stored thereon;

a first camera module configured to provide first image data representative of a first image;

a second camera module configured to provide second image data representative of a second image, wherein the first and second camera modules are arranged either side of an axis about which the first camera module is rotatable relative to the second camera module, and are arranged such that, when the first camera module is rotated relative to the second camera module by less than a threshold angle, a region of the first image overlaps a region of the second image, wherein the computer-readable code, when executed by the at least one processor, causes the at least one processor:

to process the first image data and the second image data; and to detect rotation of the first camera module relative to the second camera module; and to be responsive to the detection of rotation, to generate third image data representative of a magnified image, the magnified image representing only corresponding portions of the overlapping regions of the first and second images.

21. The apparatus of claim 20, wherein the computer-readable code, when executed by the at least one processor, causes the at least one processor:

to detect an angle of rotation of the first camera module relative to the second camera module; and as the angle of rotation increases thereby causing gradual reduction in a size, in a first dimension, of the corresponding portions of the overlapping regions of the first and second images which are represented by the magnified image, gradually to reduce, in a second dimension, the size of the corresponding portions of the overlapping regions of the first and second images which are represented by the magnified image.

* * * * *

UNITED STATES PATENT AND TRADEMARK OFFICE
CERTIFICATE OF CORRECTION

| | | |
|---|---|---|
| PATENT NO. | : 8,754,961 B2 | Page 1 of 1 |
| APPLICATION NO. | : 13/211975 | |
| DATED | : June 17, 2014 | |
| INVENTOR(S) | : Leskela et al. | |

It is certified that error appears in the above-identified patent and that said Letters Patent is hereby corrected as shown below:

Title page,
Item (75) Inventors: "Aki Happonen, Kliminki (FI)" should read --Aki Happonen, Kiiminki (FI)--.

Signed and Sealed this
Eleventh Day of November, 2014

Michelle K. Lee
*Deputy Director of the United States Patent and Trademark Office*